United States Patent [19]
Reinartz et al.

[11] Patent Number: 5,148,834
[45] Date of Patent: Sep. 22, 1992

[54] PISTON-TYPE PRESSURE ACCUMULATOR FOR TRACTION SLIP CONTROLLED BRAKE SYSTEMS AND SWITCHING ARRANGEMENT FOR SAME

[75] Inventors: Hans-Dieter Reinartz, Frankfurt am Main; Hajo Pickel, Kelkheim, both of Fed. Rep. of Germany

[73] Assignee: Alfred Teves GmbH, Frankfurt am Main, Fed. Rep. of Germany

[21] Appl. No.: 614,803

[22] Filed: Nov. 16, 1990

[30] Foreign Application Priority Data

Dec. 14, 1989 [DE] Fed. Rep. of Germany ....... 3941241

[51] Int. Cl.$^5$ ............................................. F16L 55/04
[52] U.S. Cl. ........................................ 138/31; 303/10
[58] Field of Search ................. 303/10, 64, 85; 138/31

[56] References Cited

U.S. PATENT DOCUMENTS

| | | | |
|---|---|---|---|
| Re. 28,890 | 7/1976 | Ingram et al. | 303/10 |
| 2,871,995 | 2/1959 | Cline | 138/31 |
| 3,177,981 | 4/1965 | Porter | 138/31 |
| 4,046,167 | 9/1977 | Papp et al. | 138/31 |
| 4,428,624 | 1/1984 | Farr | 303/10 |
| 4,640,555 | 2/1987 | Bertling et al. | 303/10 |
| 4,708,404 | 11/1987 | Seibert et al. | 303/10 |
| 4,799,048 | 1/1989 | Goshima et al. | 138/31 |

FOREIGN PATENT DOCUMENTS

| | | | |
|---|---|---|---|
| 3511639 | 10/1985 | Fed. Rep. of Germany | 303/10 |
| 3629564 | 3/1988 | Fed. Rep. of Germany | |
| 2538328 | 12/1983 | France | |
| 2037016 | 7/1980 | United Kingdom | 303/10 |
| 2188386 | 9/1987 | United Kingdom | |

Primary Examiner—Harvey C. Hornsby
Assistant Examiner—James F. Hook
Attorney, Agent, or Firm—Robert P. Seitter; J. Gordon Lewis

[57] ABSTRACT

A piston-type pressure accumulator for traction slip controlled brake systems, and a switching arrangement provided therewith. An accumulator piston (2) is hydraulically pressurized through a compression spring (1) and slidingly guided within a housing (4). At least one sealing element (27) is provided at the accumulator piston (2) which separates an accumulator chamber (21) from a spring chamber (24). The compression spring (1) is clamped between a first cap (3) directly contacting and surrounding the accumulator piston (2) and a second cap (5) straddling the housing (4) and the first cap (3), the first cap (3) performing a relative movement within the second cap (5) which is sensed by a control switch (7), charging of the accumulator chamber 21 is controlled by energization of a loading valve (8) and pump (9), in turn controlled by the control switch (7).

7 Claims, 1 Drawing Sheet

PISTON-TYPE PRESSURE ACCUMULATOR FOR TRACTION SLIP CONTROLLED BRAKE SYSTEMS AND SWITCHING ARRANGEMENT FOR SAME

The present invention relates to a piston-type pressure accumulator for traction slip controlled brake systems including an accumulator piston hydraulically pressurized through a compression spring and slidingly guided within a housing. At least one sealing element is provided at the accumulator piston which separates an accumulator chamber from a spring chamber.

Piston-type pressure accumulators of this type are known and are applied in various applications in the art. Frequently, hydraulic or pneumatic fluids are accumulated by means of piston-type pressure accumulators. For example, in conjunction with traction slip controlled brake systems, the additional arrangement of a piston-type pressure accumulator in the branch of the main pump pressure line allows a continuous power supply of the associated brake system as soon as the driving wheels are subject to the traction slip control action. This is done without having to provide for a pressure build-up through the pump.

A piston-type pressure accumulator is known from German patent document No. 3,619,990 which accommodates a slidable piston within a cylindrical housing, with three springs arranged in parallel clamped between the hollow space of the piston and the housing. The hydraulic pressure is brought to bear on the piston through a coaxial bore in the cover lid which in the unpressurized condition is initially in contact with the extension of the piston through a flat seal.

Due to the precise guidance and support requirements of the set of springs between the short piston stem and the supporting surface of the housing and as a result of the lack of integration of the control, regulating and venting unit in within the housing, the described piston-type pressure accumulators do not provide a functionally improved, compact and inexpensive design. This therefore impedes the commercial and functional applicability of the system.

Therefore, the present invention has as an object to further develop a piston-type pressure accumulator of the type described in such a manner which avoids the foregoing disadvantages, and which provides a compact piston-type pressure accumulator with an improved guidance of the springs and with an improved functional arrangement. This object is achieved by the features of the present invention.

SUMMARY OF THE INVENTION

The present invention contemplates an accumulator having a compact housing, piston and spring arrangement which also incorporates an integrated charging valve and position switch mounting.

An inner cap and outer cap are disposed over a housing extension within which an accumulator piston is mounted in a bore, one end of the piston engaging the inside of the inner cap end and slidably movable in a bore, the piston advancing against the force of a spring interposed between the inner and outer caps when fluid under pressure is supplied behind the opposite end of the piston.

By a mechanical contact switch mounted in the housing positioned to be operated by retraction of the inner cap, an inexpensive yet sufficiently exact detection of the piston position is afforded in order to require only one control signal for switching of the charging valve and/or of the pump. It is of particular advantage to arrange the charging valve as a 2/2-way valve electromagnetically operated to be open for the flow of hydraulic fluid in order to pressurize the accumulator piston through the adjacent hydraulic fluid duct. The charging valve is mounted in the housing transversely to the piston and housing extension. This arrangement is an advantage of the present invention. In order to comply with the safety requirements with regard to pressure limitation and a compensation of thermally induced pressure fluctuations, according to a further aspect of the present invention, a pressure relief valve is combined with the charging valve which allows a reduction of the pressure in the event that an acceptable accumulator pressure is exceeded with the charging valve closed.

BRIEF DESCRIPTION OF THE DRAWING

Further advantages, features and applications of the present invention will now be described in conjunction with the accompanying drawing wherein.

DETAILED DESCRIPTION

Figure 1:
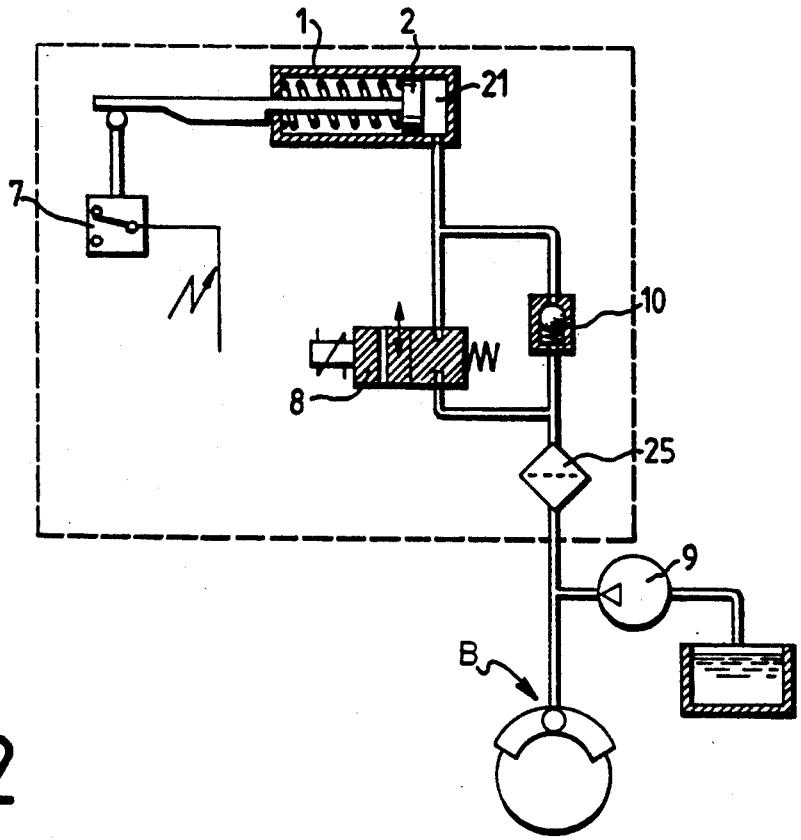
FIG. 1 illustrates a diagram of the inventive piston-type pressure accumulator and associated braking system components; and, FIG. 2 illustrates a preferred embodiment of a compact-design piston-type pressure accumulator according to the invention in a longitudinal section.

The basic diagram of the piston-type pressure accumulator of FIG. 1 illustrates the interacting of the accumulator, control and regulating units. The pressure accumulator system is connected to the branch of the main pressure line between the pump 9 and the brakes B, and is filled during the pumping phase through a charging valve 8 until the accumulator piston 2 comes to rest at the fully charged end position upon overcoming the prestressing force of the piston-side spring. At this point, the contact switch 7 simultaneously commutates the charging valve 8 electromagnetically through a current impulse depending on the position of the piston 2, so that the charging valve 8, arranged as a 2/2-way valve shuts off the hydraulic fluid supply in the switching position shown in Figure, upon reaching the maximum stroke of the piston. If the admissible accumulator pressure is exceeded, as by thermal influence outflow of fluid takes place through the pressure relief valve 10 comprising a non-return valve and which is connected in parallel to the charging valve 8, so that the safety requirements and functional reliability are met.

The charging and the pressure relief valves 8, 10 are preceded in a series connection by a filter element 25 which prevents any clogging and, thus, any detrimental effect of dirt on the functioning of the succeeding components.

In the de-energized switching position, the charging valve 8 acts in a spring-controlled locking manner in order not to exceed the existing filling volume of the brake unit B in the event of a defect, if any, of the actuating system of the charging valve 8.

Figure 2:
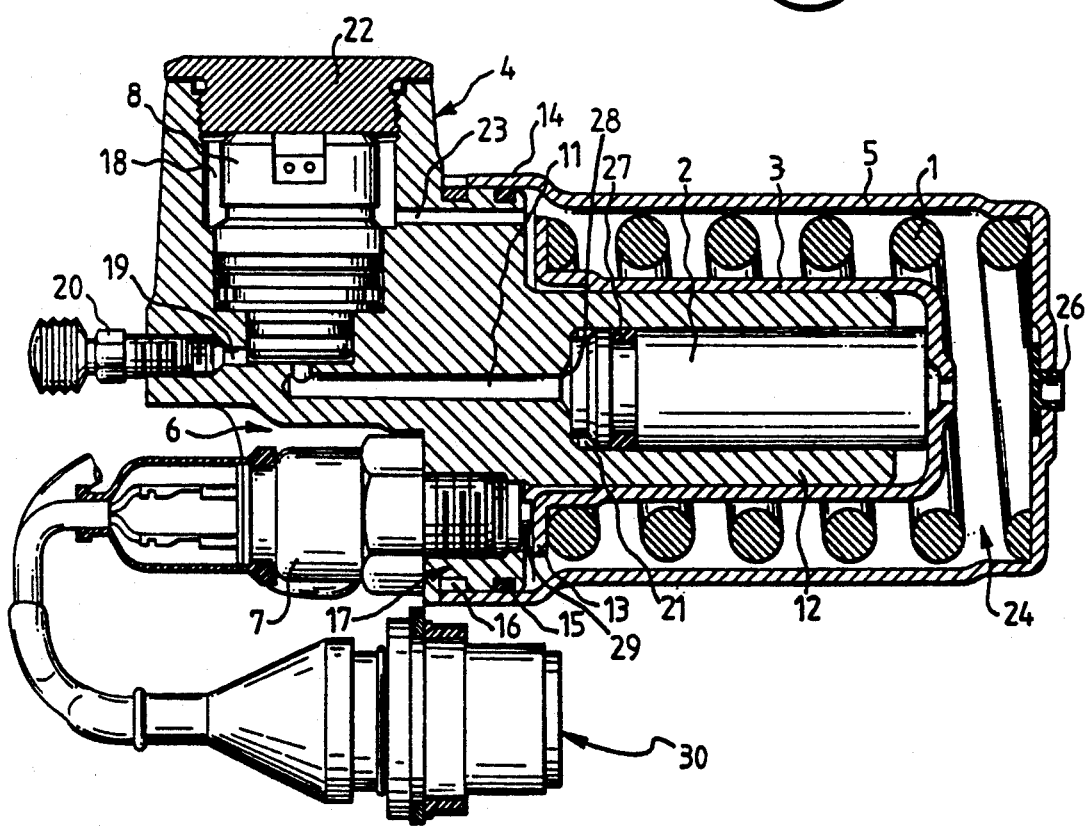

FIG. 2 shows the piston-type pressure accumulator in accordance with the present invention in a longitudinal section with the control switch 7, the charging valve 8, the vent valve 20, which are jointly integrated in the housing 4, and with the accumulator piston 2 which is guided in a bore in the housing extension 12 projecting from the housing main portion, the piston 2 furnished with a sealing element 27. A thin-walled, cup-shaped inner cap 3 is directly fit over housing extension 12 and is slidingly guided coaxially over the outer wall of the housing extension 12. The front surface of the accumulator piston 2 extends into abutment with the end wall of the inner cap 3. Accordingly, in the event of pressure balance, the accumulator piston 2 assumes its basic position, coming to rest with its front surface abutted against the housing stop consisting of the inside of an outer cap 5, under the effect of the compression spring 1 being clamped in between the inner and outer caps 3, 5. The pressure accumulator duct 11 which is pressurized by the charging valve 8 succeeds a cone-shaped entrance port at the front surface of the accumulator piston 2 which positioned in the retracted position prior to being is subject to the action of the hydraulic fluid. Charging valve 8 is positioned radially outwardly in respect of the longitudinal axis of the housing and with its axis extending transversely in respect that of the accumulator piston 2. Thus, the overall length of the piston-type pressure accumulator is as short as possible.

In an offset position in respect to the axis of the accumulator duct 11, a vent duct 19 is furnished with a vent screw 20, which communicates with the passage 11 and the outlet of the charging valve 8. Accordingly, an evacuation of the pressure accumulator zone 21 can take place independently of the switching position of the charging valve 8.

Any leaking hydraulic fluid which may invade the adjacent spring chamber 24 through the seal of the piston 2 or through the connecting duct 23 of the housing opening 18 is allowed to flow off through fine grooves in a front-side protective plug 26 in the outer cap 5. The enlarged end portion of the inner cap 3 is formed with a collar 13 extending outwardly at right angles from the main portion against which bears one end of the compression spring 1. A control switch 7 is screwed into the housing step 17 on the opposite side having a contact 29 which comes into abutment with the collar 13 when the piston 2 and cap move to their fully retracted position shown in FIG. 2. In this way, in the condition shown in FIG. 2, control switch 7 signals the discharged condition of the piston-type pressure accumulator through an electric connection established via connector 30 to a control circuit (not shown in the drawing). The so that the charging valve 8 in its closed position in the de-energized condition and, thus, in its switching position in which it shuts off the hydraulic fluid supply as the piston moves to the left in discharging fluid. However, when reaching the fully discharged condition shown in FIG. 2, control switch signal causes the charging valve 8 and pump 9 to be reenergized, to again cause charging of the chamber 21.

Due to the housing recess 6, to the narrow housing step 17 in the range of the control switch 7 and of the charging valve 8 positioned in the circumferential direction in respect to the longitudinal axis of the housing, a particularly compact, light-weight accumulator unit results, which, for example, renders the unit ideal for integration with the pump housing of a traction slip controlled brake system. Beyond the advantageous feature of a compact design, the space-saving telescoping of the two caps 3, 5 consisting of deep-drawn parts provides a considerable reduction of cost without sacrificing functional reliability. The outer cap 5 need only be slid onto the housing 4 and to be lanced into the partial recesses 16 in the end region. The closing plug 22 which is provided for fixing the charging valve 8 in the housing opening 18 may, for example, be arranged in the shape of a screwed union, the screw barrel exerting the necessary retaining force on the front surface of the charging valve 8. Other positive and non-positive locking or closing elements for the positioning of the charging valve 8 can be provided although not here shown.

The forms of the invention illustrated and described herein are but preferred embodiments of these teachings in the forms currently preferred for manufacture. They are shown by way of illustration rather than limitation and it is pointed out that the scope of the present invention is limited solely by the appended claims.

What is claimed is:

1. In combination, accumulator means for a traction slip controlled brake system including a hydraulic wheel cylinder, pump means having an outlet supplying hydraulic fluid under pressure to said wheel cylinder, passage means connecting and accumulator means with said pump means outlet to accumulate fluid under pressure for actuation of said wheel cylinder, said accumulator means comprising a housing, said housing including a main portion and an elongated extension portion projecting from said main housing formed with a bore opening at one end of said extension, an accumulator piston slidably received in said bore, a cup shaped inner cap slidably received over said extension portion and having an end engaged from within by one end of said piston, said inner cap also formed with a collar movable on said housing extension to a position adjacent said housing main portion with said piston moved to a retracted position in said bore, a cup shaped outer cap received over said inner cap with an annular space therebetween and extending to and fixed on said housing main portion, a compression spring received over said inner cap interposed between said collar and the inside of said outer cap, a space intervening between said inner and outer cap ends with said piston in a retracted position in said housing extension bore accomodating advancing movement of said piston until the outside of said inner cap end abuts against the inside of said outer cap end, a fluid passage formed in said housing extending into said housing extension bore, electromechanical charging valve means controlling communication between said pump outlet and said fluid passage to enable flow of fluid under pressure behind said piston to cause movement of said piston against the force of said compression spring to accumulate fluid under pressure in said bore; and control switch means having a contact positioned to be engaged by said inner cap collar, said control switch controlling activation of said charging valve in correspondence with the position of said collar whereby the position of said piston controls activation of said charging valve.

2. The combination according to claim 1 wherein said housing main portion is formed with a bore within which said charging valve is mounted.

3. The combination according to claim 2 wherein said housing main portion bore within which said charging valve is mounted extends transversely to said housing extension bore.

4. The combination according to claim 3 wherein said fluid passage extends into said main portion to said main housing bore, and extends into communication therewith.

5. The combination according to claim 3 wherein said control switch means is mounted onto said main housing portion, said housing main portion formed with a recess extending towards said extension portion approximately aligned with said charging valve and housing main portion bore, said control switch disposed in said recess.

6. The combination according to claim 3 further including a passage extending from said housing main portion bore to said space between said inner and outer caps, and a drain plug in said outer cap, whereby leakage fluid can escape from said space.

7. The combination according to claim 3 further including a vent passage extending through said housing main portion to said fluid passage and a vent plug received in said vent passage whereby said extension bore may be vented therethrough independently of said charging valve.

* * * * *